US012309163B2

(12) United States Patent
Arora et al.

(10) Patent No.: US 12,309,163 B2
(45) Date of Patent: May 20, 2025

(54) SYSTEM AND METHOD FOR MANAGING METAVERSE INSTANCES

(71) Applicant: Bank of America Corporation, Charlotte, NC (US)

(72) Inventors: Saurabh Arora, Gurugram (IN); Sandeep Kumar Chauhan, Hyderabad (IN); Puneetha Polasa, Telangana (IN); Sanchit Taggar, New Delhi (IN); Bhagya Lakshmi Sudha Lavanya Mallidi, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 217 days.

(21) Appl. No.: 18/306,962

(22) Filed: Apr. 25, 2023

(65) Prior Publication Data

US 2024/0364697 A1 Oct. 31, 2024

(51) Int. Cl.
*H04L 9/40* (2022.01)
*G06F 12/14* (2006.01)

(52) U.S. Cl.
CPC ........ *H04L 63/105* (2013.01); *G06F 12/1491* (2013.01); *H04L 63/102* (2013.01); *H04L 63/107* (2013.01); *G06F 2212/1052* (2013.01)

(58) Field of Classification Search
CPC ... H04L 63/105; H04L 63/102; H04L 63/107; G06F 12/1492; G06F 2212/1052
See application file for complete search history.

(56) References Cited

U.S. PATENT DOCUMENTS

| | | | |
|---|---|---|---|
| 8,245,283 B2 | 8/2012 | Dawson et al. | |
| 8,814,691 B2 | 8/2014 | Haddick et al. | |
| 9,378,296 B2 | 6/2016 | Clarke | |
| 9,734,633 B2 | 8/2017 | Lamb et al. | |
| 10,203,762 B2 | 2/2019 | Bradski et al. | |
| 10,242,032 B2 | 3/2019 | Sundaresan et al. | |
| 10,242,501 B1 * | 3/2019 | Pusch | H04N 21/44218 |
| 10,410,422 B2 | 9/2019 | Rochford et al. | |
| 10,551,993 B1 | 2/2020 | Sanocki et al. | |
| 10,699,482 B2 | 6/2020 | Demirli et al. | |
| 10,981,061 B2 | 4/2021 | Benedetto et al. | |
| 11,347,054 B2 * | 5/2022 | Woods | G06T 19/006 |
| 11,775,132 B1 * | 10/2023 | McDannald | G06F 3/04815 |
| | | | 715/741 |
| 12,175,614 B2 * | 12/2024 | Rudman | G06V 10/25 |
| 12,182,248 B2 * | 12/2024 | Naik | G06T 19/006 |

(Continued)

*Primary Examiner* — Harris C Wang (57) ABSTRACT

A method for managing metaverse instances includes registering a physical control level for a user. The physical control level includes information about physical locations and data items that the user is allowed to access within an entity. A digital identity is generated for the user. The digital identity includes a virtual control level for an avatar of the user and allows the avatar to access a metaverse instance of a metaverse of the entity. The virtual control level is synchronized with the physical control level. Computing resources to be allocated to the metaverse instance are determined. A first instruction is sent to a metaverse server to open the metaverse instance. A second instruction is sent to the metaverse server to allocate the computing resources to the metaverse instance. A third instruction is sent to the metaverse server to generate the avatar. The avatar is allowed access to the metaverse instance.

20 Claims, 4 Drawing Sheets

(56) References Cited

U.S. PATENT DOCUMENTS

| | | | |
|---|---|---|---|
| 12,192,287 B2* | 1/2025 | Dasher | H04L 67/131 |
| 2015/0363986 A1* | 12/2015 | Hoyos | H04W 12/08 |
| | | | 340/5.61 |
| 2016/0300392 A1 | 10/2016 | Jonczyk et al. | |
| 2018/0095636 A1 | 4/2018 | Valdivia et al. | |
| 2019/0158549 A1 | 5/2019 | Miller | |
| 2021/0232787 A1* | 7/2021 | Salewski | G06Q 10/087 |
| 2024/0078536 A1* | 3/2024 | Dashkov | G06Q 20/36 |
| 2024/0160272 A1* | 5/2024 | Soryal | G06F 3/011 |
| 2024/0261692 A1* | 8/2024 | Sliwka | H04L 9/3213 |
| 2024/0354760 A1* | 10/2024 | Tsai | G06Q 30/06 |
| 2024/0370865 A1* | 11/2024 | Bernardi | G06Q 20/36 |

* cited by examiner

SYSTEM AND METHOD FOR MANAGING METAVERSE INSTANCES

TECHNICAL FIELD

The present disclosure relates generally to virtual reality systems, and more specifically to a system and method for managing metaverse instances.

BACKGROUND

An entity may allow users access to both physical and virtual environments. Users may have different access levels in the physical environment. There is a need for efficient management of user access, such that each user has a similar access level in both physical and virtual environments of the entity, and such that different users with different access levels are allowed access to corresponding virtual environment instances.

SUMMARY

The system described in the present disclosure provides several practical applications and technical advantages that overcome the current technical problems with managing local metaverse instances.

In general, a metaverse management system is configured to maintain both physical control levels in the physical world and virtual control levels in the virtual world, for a plurality of users. The metaverse management system is configured to synchronize the virtual control levels with physical control levels, such that updates for the physical control levels are reflected in the virtual control levels and the users have similar levels of access in both the physical and virtual environments. The metaverse management system generates digital identities for the users based on the virtual control levels. The digital identities are used by the users to gain access to the metaverse hosted by a metaverse server of an entity. The metaverse management system is configured to determine computing resources (e.g., amount of memory, amount of network bandwidth, and/or number of processors) to be allocated to a metaverse instance based on a digital identity of a user and send an instruction to the metaverse server to release the allocated computing resources as soon as the metaverse instance is terminated upon completion of interactions between the user and the metaverse server. The metaverse management system is further configured to identify a distance of the user from the entity, and grant or deny access to the metaverse based on the identified distance.

By synchronizing virtual control levels with physical control levels of users, the users have similar levels of access in both physical and virtual environments. Furthermore, the synchronization process allows seamless alignment of the virtual control levels with the physical control levels upon updating the physical control levels. By releasing computing resources allocated to a metaverse instance as soon as the metaverse instance is terminated, the computing resources that would otherwise be unusable may be utilized for further applications. For example, freed computing resources may be allocated to a new metaverse instance. Accordingly, in some embodiments, overall computing resource utilization may be reduced, and resource utilization efficiency may be increased.

Accordingly, the following disclosure is particularly integrated into practical applications of: (1) synchronizing virtual control levels with physical control levels of users, such that the users have similar levels of access in both physical and virtual environments; (2) reducing computing resource utilization of a computing system; and (3) improving resource utilization efficiency of a computing system.

In one embodiment, a system includes a memory and a processor communicatively coupled to the memory. The memory is configured to store physical control levels for a plurality of users and user credentials for each user. Each physical control level includes a physical access level for a respective user, a physical proximity threshold for the respective user, and a physical administrative access indicator for the respective user. The physical access level includes information about physical locations and data items that the respective user is allowed to access within an entity. The physical administrative access indicator indicates if the respective user has an administrative access. The processor is configured to receive first user credentials of a first user from a first user device, authenticate the first user based on the first user credentials, and register a first physical control level for the first user. The first physical control level includes a first physical access level for the first user, a first physical proximity threshold for the first user, and a first physical administrative access indicator for the first user. The processor is further configured to generate a first digital identity for the first user based on the first user credentials of the first user. The first digital identity includes a first virtual control level for a first avatar of the first user. The first digital identity allows the first avatar of the first user to access a first metaverse instance of a metaverse of the entity based on the first virtual control level. The first virtual control level includes a first virtual access level for the first user, a first virtual proximity threshold for the first user, and a first virtual administrative access indicator for the first user. The processor is further configured to synchronize the first virtual control level of the first digital identity for the first user with the first physical control level for the first user, determine a first physical distance of the first user from the entity, and determine if the first physical distance of the first user is less than the first virtual proximity threshold. In response to determining that the first physical distance is less than the first virtual proximity threshold, the processor is further configured to determine first computing resources to be allocated to the first metaverse instance based on the first digital identity, send a first instruction to a metaverse server to open the first metaverse instance, send a second instruction to the metaverse server to allocate the first computing resources to the first metaverse instance, send a third instruction to the metaverse server to generate the first avatar of the first user, and allow the first avatar of the first user access to the first metaverse instance.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

As described above, previous technologies fail to manage metaverse instances. Embodiments of the present disclosure and their advantages may be understood by referring to FIGS. 1, 2A, 2B and 2C. FIGS. 1, 2A, 2B and 2C are used to describe a system and method for managing metaverse instances.

System Overview

Figure 1:
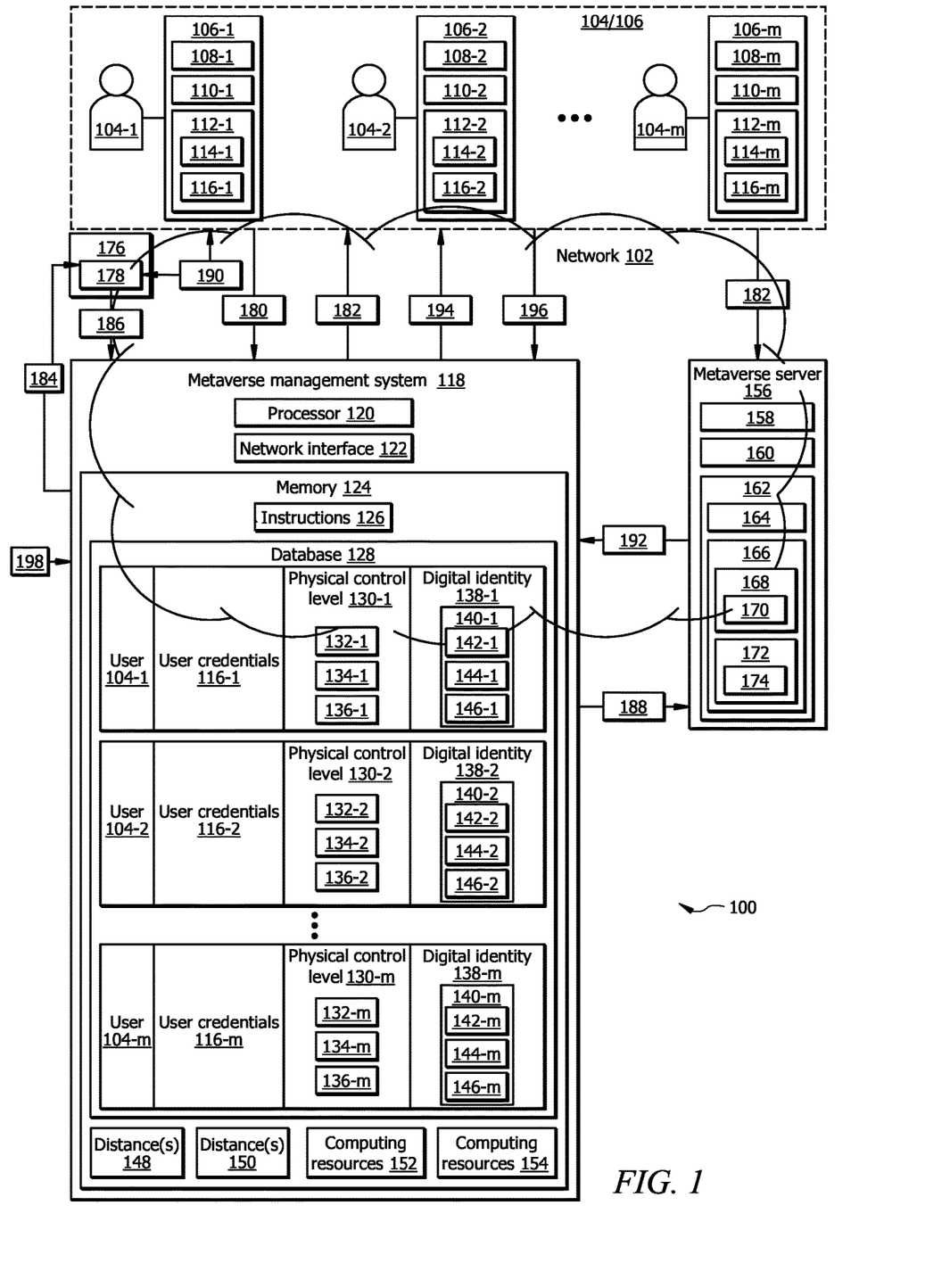
FIG. 1 illustrates an embodiment of a system configured to manage metaverse instances.

FIG. 1 illustrates an embodiment of a system 100 that is generally configured to host and manage metaverse instances for an entity 176. The entity 176 may be a physical facility of an organization, a company, a business, or the like. The entity 176 may provide services to a plurality of users 104-1 through 104-$m$. The entity 176 may comprise one or more ultra-wide band sensors 178 that are configured to determine distances 186 of users 104-1 through 104-$m$ from the entity 176.

In certain embodiments, the system 100 comprises a plurality of user devices 106 (e.g., user devices 106-1 through 106-$m$) operably coupled to a metaverse management system 118 and a metaverse server 156 via a network 102. Network 102 enables the communication between the components of the system 100. In other embodiments, the system 100 may not have all the components listed and/or may have other elements instead of, or in addition to, those listed above. For example, the metaverse management system 118 and the metaverse server 156 may be integrated into a same system.

In general, the metaverse management system 118 is configured to maintain both physical control levels 132-1 through 132-$m$ in physical world and virtual control levels 140-1 through 140-$m$ in virtual world for the users 104-1 through 104-$m$, respectively. The metaverse management system 118 is configured to synchronize the virtual control levels 140-1 through 140-$m$ with physical control levels 132-1 through 132-$m$, respectively, such that updates for the physical control levels 132-1 through 132-$m$ are reflected in the virtual control levels 140-1 through 140-$m$, and the users 104-1 through 104-$m$ have similar levels of access in both physical and virtual environments. The metaverse management system 118 generates digital identities 138-1 through 138-$m$ for the users 104-1 through 104-$m$ based on the virtual control levels 140-1 through 140-$m$. The digital identities 138-1 through 138-$m$ are used by the users 104-1 through 104-$m$, respectively, to gain access to a metaverse 166 hosted by the metaverse server 156. The metaverse management system 118 is configured to determine computing resources (e.g., computing resources 152) to be allocated to a metaverse instance (e.g., metaverse instance 168) based on a digital identity (e.g., digital identity 138-1) of a user (e.g., user 104-1) and send an instruction (e.g., respective one of instructions 188) to the metaverse server 156 to release the allocated computing resources (e.g., computing resources 152) as soon as the metaverse instance (e.g., metaverse instance 168) is terminated upon completion of interactions between the user (e.g., user 104-1) and the metaverse server 156. The metaverse management system 118 is further configured to identify a distance (e.g., distance 148) of the user (e.g., users 104-1) from the entity 176 and grant or deny access to the metaverse 166 based on the identified distance (e.g., distance 148).

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

User Devices

Each of the user devices 106 (e.g., user devices 106-1 through 106-$m$) is generally any device that is configured to process data and interact with a respective one of users 104 (e.g., users 104-1 through 104-$m$). Examples of a user device include, but are not limited to, a personal computer, a desktop computer, a workstation, a server, a laptop, a tablet computer, a mobile phone (such as a smartphone), etc. Each of the user devices 106-1 through 106-$m$ may include a user interface, such as a display, a microphone, keypad, or other appropriate terminal equipment usable by a respective one of the users 104-1 through 104-$m$.

Each of the user devices 106-1 through 106-$m$ may comprise a respective one of processors 108-1 through 108-$m$ in signal communication with a respective one of memories 112-1 through 112-$m$ and a respective one of network interfaces 110-1 through 110-$m$. Each of the processors 108-1 through 108-$m$ comprises one or more processors operably coupled to the memory 110. Each of the processors 108-1 through 108-$m$ is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 108-1 through 108-$m$ may be a programmable logic device, a microcontroller, a microprocessor, or any suitable combination of the preceding. The one or more processors are configured to process data and may be implemented in hardware or software. For example, each of the processors 108-1 through 108-$m$ may be 8-bit, 16-bit, 32-bit, 64-bit, or of any other suitable architecture. The one or more processors are configured to implement various software instructions to perform the operations described herein. For example, the one or more processors are configured to execute respective software instructions 114-1 through 114-$m$ and perform one or more functions described herein.

Each of the network interfaces 110-1 through 110-$m$ is configured to enable wired and/or wireless communications (e.g., via network 102). Each of the network interfaces 110-1 through 110-*m* is configured to communicate data between a respective one of the user devices 106-1 through 106-*m* and other components of the system 100. For example, each of the network interfaces 110-1 through 110-*m* may comprise a WIFI interface, a local area network (LAN) interface, a wide area network (WAN) interface, a modem, a switch, or a router. Each of the processors 108-1 through 108-*m* is configured to send and receive data using a respective one of the network interfaces 110-1 through 110-*m*. Each of the network interfaces 110-1 through 110-*m* may be configured to use any suitable type of communication protocol as would be appreciated by one of ordinary skill in the art.

Each of the memories 112-1 through 112-*m* may be volatile or non-volatile and may comprise a read-only memory (ROM), random-access memory (RAM), ternary content-addressable memory (TCAM), dynamic random-access memory (DRAM), and static random-access memory (SRAM). Each of the memories 112-1 through 112-*m* may be implemented using one or more disks, tape drives, solid-state drives, and/or the like. Each of the memories 112-1 through 112-*m* may store any of the information described in FIGS. 1, 2A, 2B and 2C along with any other data, instructions, logic, rules, or code operable to implement the function(s) described herein when executed by a respective one of the processors 108-1 through 108-*n*. Each of the memories 112-1 through 112-*m* is operable to store a respective one of the software instructions 114-1 through 114-*m*, and/or any other data and instructions. Each of the software instructions 114-1 through 114-*m* may comprise any suitable set of software instructions, logic, rules, or code operable to be executed by a respective one the processors 108-1 through 108-*n*. The memories 112-1 through 112-*m* may further store user credentials 116-1 through 116-*m* of the users 104-1 through 104-*m*, respectively.

In operation, each of the user devices 106-1 through 106-*m* is configured to send respective user credentials 180 to the metaverse management system 118. In embodiments when the user credentials 180 are sent by the user device 106-1, the user credentials 180 comprise user credentials 116-1. In embodiments when the user credentials 180 are sent by the user device 106-2, the user credentials 180 comprise user credentials 116-2. In embodiments when the user credentials 180 are sent by the user device 106-*m*, the user credentials 180 comprise user credentials 116-*m*.

Each of the user devices 106-1 through 106-*m* is further configured to exchange one or more signals 190 with the ultra-wide band sensors 178. The ultra-wide band sensors 178 are configured to determine distances 186 of users 104-1 through 104-*m* from the entity 176 based on the signals 106.

Each of the user devices 106-1 through 106-*m* is further configured to send a respective one of notifications 196 to the metaverse management system 118 that interactions of a respective user with a respective metaverse instance are completed. In one embodiment, the user device 106-1 sends a notification 196 to the metaverse management system 118 that interactions of the user 104-1 with a metaverse instance 168 are completed. In another embodiment, the user device 106-2 sends a notification 196 to the metaverse management system 118 that interactions of the user 104-2 with a metaverse instance 172 are completed.

Each of the user devices 106-1 through 106-*m* is further configured to access a respective metaverse instance hosted by the metaverse server 156. In certain embodiments, a user (e.g., respective one of users 104-1 through 104-*m*) sends a digital identity 182 to the metaverse server 156 and accesses a respective metaverse instance using a respective avatar. In embodiments when the digital identity 182 is sent by the user 104-1, the digital identity 182 comprises the digital identity 138-1. In embodiments when the digital identity 182 is sent by the user 104-2, the digital identity 182 comprises the digital identity 138-2. In embodiments when the digital identity 182 is sent by the user 104-*m*, the digital identity 182 comprises the digital identity 138-*m*. In one embodiment, the user 104-1 sends the digital identity 138-1 to the metaverse server 156 and accesses the metaverse instance 168 using an avatar 170. In another embodiment, the user 104-2 sends the digital identity 138-2 to the metaverse server 156 and accesses the metaverse instance 172 using an avatar 174.

Metaverse Management System

The metaverse management system 118 is generally any device that is configured to process data and communicate with other components of the system 100 via the network 102. The metaverse management system 118 may comprise a processor 120 in signal communication with a memory 124 and a network interface 122.

Processor 120 comprises one or more processors operably coupled to the memory 124. The processor 120 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 120 may be a programmable logic device, a microcontroller, a microprocessor, or any suitable combination of the preceding. The one or more processors are configured to process data and may be implemented in hardware or software. For example, the processor 120 may be 8-bit, 16-bit, 32-bit, 64-bit, or of any other suitable architecture. The one or more processors are configured to implement various software instructions to perform the operations described herein. For example, the one or more processors are configured to execute software instructions 126 and perform one or more functions described herein.

Network interface 122 is configured to enable wired and/or wireless communications (e.g., via network 102). The network interface 122 is configured to communicate data between the metaverse management system 118 and other components of the system 100. For example, the network interface 122 may comprise a WIFI interface, a local area network (LAN) interface, a wide area network (WAN) interface, a modem, a switch, or a router. The processor 120 is configured to send and receive data using the network interface 122. The network interface 122 may be configured to use any suitable type of communication protocol as would be appreciated by one of ordinary skill in the art.

Memory 124 may be volatile or non-volatile and may comprise a read-only memory (ROM), random-access memory (RAM), ternary content-addressable memory (TCAM), dynamic random-access memory (DRAM), and static random-access memory (SRAM). Memory 124 may be implemented using one or more disks, tape drives, solid-state drives, and/or the like. The memory 124 may store any of the information described in FIGS. 1, 2A, 2B and 2C along with any other data, instructions, logic, rules, or code operable to implement the function(s) described herein. The memory 124 is operable to store software instructions 126, and/or any other data and instructions. The software instructions 126 may comprise any suitable set of software instructions, logic, rules, or code operable to be executed by the processor 120.

Memory 124 may further comprise a database 128 that stores user credentials 116-1 through **116-*m*, physical control levels 130-1 through 130-*m*, and digital identities 138-1 through 128-*m* of the users 104-1 through 104-*m*, respectively. The physical control levels 130-1 through 130-*m* provide control levels in the physical world. The physical control levels 130-1 through 130-*m* comprise physical access levels 132-1 through 132-*m*, physical proximity thresholds 134-1 through 134-*m*, and physical administrative access indicators 136-1 through 136-*m*. The physical access levels 132-1 through 132-*m* comprise information about physical locations and data items that the users 104-1 through 104-*m* are allowed to access within the entity 176. Some or all of the physical control levels 130-1 through 130-*m* may be different from one another. The physical proximity thresholds 134-1 through 134-*m* comprise distances beyond which the users 104-1 through 104-*m* are denied access to the metaverse 166. Some or all of the physical proximity thresholds 134-1 through 134-*m* may be different from one another. The physical administrative access indicators 136-1 through 136-*m* indicate if the users 104-1 through 104-*m* have an administrative access. Some or all of the physical administrative access indicators 136-1 through 136-*m*** may be different from one another.

The digital identities 138-1 through **138-*m* comprise virtual control levels 140-1 through 140-*m*, respectively. The virtual control levels 140-1 through 140-*m* provide control levels in the metaverse 166. The virtual control levels 140-1 through 140-*m* comprise virtual access levels 142-1 through 142-*m*, virtual proximity thresholds 144-1 through 144-*m*, and virtual administrative access indicators 146-1 through 146-*m*. In certain embodiments, the physical access levels 132-1 through 132-*m* are same as the virtual access levels 142-1 through 142-*m*, respectively. In certain embodiments, the physical proximity thresholds 134-1 through 134-*m* are same as the virtual proximity thresholds 144-1 through 144-*m*, respectively. In certain embodiments, the physical administrative access indicators 136-1 through 136-*m* are same as the virtual administrative access indicators 146-1 through 146-*m***, respectively.

In operation, the metaverse management system 118 receives user credentials 180 of a user (e.g., respective one of users 104-1 through **104-*m*) from a user device (e.g., respective one of user devices 106-1 through 106-*m*). In embodiments when the user credentials 180 are received from the user device 106-1, the user credentials 180 comprise the user credentials 116-1. In embodiments when the user credentials 180 are received from the user device 106-2, the user credentials 180 comprise the user credentials 116-2. In embodiments when the user credentials 180 are received from the user device 106-*m*, the user credentials 180 comprise the user credentials 116-*m***.

A processor 120 of the metaverse management system 118 compares the received user credentials 180 of the user (e.g., respective one of users 104-1 through **104-*m*) to stored user credentials (e.g., respective one of user credentials 116-1 through 116-*m*) for the user (e.g., respective one of users 104-1 through 104-*m*). In response to determining that the received user credentials 180 of the user (e.g., respective one of users 104-1 through 104-*m*) matches the stored user credentials (e.g., respective one of user credentials 116-1 through 116-*m*) of the user (e.g., respective one of users 104-1 through 104-*m*), the processor 120 authenticates the user (e.g., respective one of users 104-1 through 104-*m***).

The processor 120 determines if a physical control level (e.g., respective one of physical control levels 130-1 through **130-*m*) of the user (e.g., respective one of users 104-1 through 104-*m*) has been registered. In other words, the processor 120 determines if the control level (e.g., respective one of physical control levels 130-1 through 130-*m*) of the user (e.g., respective one of users 104-1 through 104-*m*) is stored in the database 128**.

In response to determining that the physical control level (e.g., respective one of physical control levels 130-1 through **130-*m*) of the user (e.g., respective one of users 104-1 through 104-*m*) has not been registered, the processor 120 generates a physical access level (e.g., respective one of physical access level 132-1 through 132-*m*), a physical proximity threshold (e.g., respective one of physical proximity thresholds 134-1 through 134-*m*) and a physical administrative access indicator (e.g., respective one of physical administrative access indicators 136-1 through 136-*m*) for the user (e.g., respective one of users 104-1 through 104-*m* of FIG. 1) based on the received user credentials 180. For example, if a physical control level of the user 104-1 has not been registered, the processor 120 generates the physical access level 132-1, the physical proximity threshold 134-1, and the physical administrative access indicator 136-1 for the user 104-1**.

The processor 120 records the physical access level (e.g., respective one of access level 132-1 through **132-*m*), the physical threshold (e.g., respective one of proximity thresholds 134-1 through 134-*m*), and the physical administrative access indicator (e.g., respective one of administrative access indicators 136-1 through 136-*m*) of the user (e.g., respective one of users 104-1 through 104-*m*) in the database 128 to register the physical control level (e.g., respective one of physical control levels 130-1 through 130-*m*) of the user (e.g., respective one of users 104-1 through 104-*m*) in the metaverse management system 118**.

The processor 120 generates a virtual access level (e.g., respective one of virtual access levels 142-1 through **142-*m*), a virtual proximity threshold (e.g., respective one of virtual proximity thresholds 144-1 through 144-*m*) and a virtual administrative access indicator (e.g., respective one of virtual administrative access indicators 146-1 through 146-*m*) of the user (e.g., respective one of users 104-1 through 104-*m*) to generate a virtual control level (e.g., respective one of virtual control levels 140-1 through 140-*m*) for the user (e.g., respective one of users 104-1 through 104-*m***).

The processor 120 generates a digital identity (e.g., respective one of digital identities 138-1 through **138-*m*) for the user (e.g., respective one of users 104-1 through 104-*m*) based on the virtual control level (e.g., respective one of virtual control levels 140-1 through 140-*m***).

The processor 120 synchronizes the virtual control level (e.g., respective one of virtual control levels 140-1 through **140-*m*) of the digital identity (e.g., respective one of digital identities 138-1 through 138-*m*) for the user (e.g., respective one of users 104-1 through 104-*m*) with the physical control level (e.g., respective one of physical control levels 130-1 through 130-*m*) for the user (e.g., respective one of users 104-1 through 104-*m*), such that the user (e.g., respective one of users 104-1 through 104-*m*) has a same control level both in physical world and the metaverse 166. In certain embodiments, the synchronization process comprises equating the virtual access level (e.g., respective one of virtual access levels 142-1 through 142-*m*), the virtual proximity threshold (e.g., respective one of virtual proximity thresholds 144-1 through 144-*m*), and the virtual administrative access indicator (e.g., respective one of virtual administrative access indicators 146-1 through 146-*m*) of the user (e.g., respective one of users 104-1 through 104-*m***) to the physical access level (e.g., respective one of physical access levels 132-1 through 132-m), the physical proximity threshold (e.g., respective one of physical proximity thresholds 134-1 through 134-m), and the physical administrative access indicator (e.g., respective one of physical administrative access indicators 136-1) of the user (e.g., respective one of users 104-1 through 104-m), respectively.

The processor 120 determines a distance 186 of the user (e.g., respective one of users 104-1 through 104-m) from the entity 176. In certain embodiments, the processor 120 sends a request 184 to the one or more ultra-wide band sensors 178 to obtain a distance of the user (e.g., respective one of users 104-1 through 104-m) from the entity 176 and receives the distance 186 from the one or more ultra-wide band sensors 170. In certain embodiments, the processor 120 determines that the user 104-1 is separated from the entity 176 by a distance 148 and the user 104-2 is separated from the entity 176 by a distance 150. In one embodiment, the distance 148 is similar to the distance 150. In another embodiment, the distance 148 is different from the distance 150.

In response to determining that the distance 186 is not less than the virtual proximity threshold (e.g., respective one of proximity thresholds 144-1 through 144-m), the processor 120 denies the user (e.g., respective one of users 104-1 through 104-m of FIG. 1) access to the metaverse 166. Subsequently, the processor 120 sends a notification 194 to the user device (e.g., respective one of user devices 106-1 through 106-m) that access to the metaverse 166 is denied.

In response to determining that the distance 186 is less than the virtual proximity threshold (e.g., respective one of proximity thresholds 144-1 through 144-m), the processor 120 determines computing resources (e.g., amount of memory, amount of network bandwidth, and/or number of processors) to be allocated to a metaverse instance based on the digital identity (e.g., respective one of digital identities 138-1 through 138-m) of the user (e.g., respective one of users 104-1 through 104-m). In an embodiment when the user is the user 104-1, the processor 120 determines computing resources 152 to be allocated to the metaverse instance 168 based on the digital identity 138-1. In an embodiment when the user is the user 104-2, the processor 120 determines computing resources 154 to be allocated to the metaverse instance 172 based on the digital identity 138-2. In certain embodiments when the virtual control level 140-1 of the digital identity 138-1 of the user 104-1 is different from the virtual control level 140-2 of the digital identity 138-2 of the user 104-2, the computing resources 152 are different from the computing resources 154, and the metaverse instance 168 is different from the metaverse instance 172.

The processor 120 sends an instruction 188 to the metaverse server 156 to open the metaverse instance. In response to receiving the instruction 188, the processor 158 of the metaverse server 156 opens the metaverse instance. For example, the processor 158 opens the metaverse instance 168 for the user 104-1 and the metaverse instance 172 for the user 104-2.

The processor 120 sends an instruction 188 to the metaverse server 156 to allocate the determined computing resources to the metaverse instance. In response to receiving the instruction 188, the processor 158 of the metaverse server 156 allocates the determined computing resources to the metaverse instance. For example, the processor 158 allocates the computing resources 152 to the metaverse instance 168 for the user 104-1 and the computing resources 154 to the metaverse instance 172 for the user 104-2.

The processor 120 sends an instruction 188 to the metaverse server 156 to generate an avatar of the user (e.g., respective one of users 104-1 through 104-m). In response to receiving the instruction 188, the processor 158 of the metaverse server 156 generates the avatar of the user (e.g., respective one of users 104-1 through 104-m). For example, the processor 158 generates the avatar 170 for the user 104-1 and the avatar 174 for the user 104-2.

The processor 120 sends the digital identity (e.g., respective one of digital identities 138-1 through 138-m) of the user (e.g., respective one of users 104-1 through 104-m) to the user device (e.g., respective one of user devices 106-1 through 106-m), which allows the user (e.g., respective one of users 104-1 through 104-m) access to the metaverse instance using the avatar. For example, the digital identity 138-1 allows user 104-1 access to the metaverse instance 168 using the avatar 170 and the digital identity 138-2 allows user 104-2 access to the metaverse instance 172 using the avatar 174.

In certain embodiments, the processor 120 may periodically determine if the physical control level (e.g., respective one of control levels 130-1 through 130-m) of the user (e.g., respective one of users 104-1 through 104-m) is updated. For example, the processor 120 may determine that a physical control level update 198 is received for the user (e.g., respective one of users 104-1 through 104-m).

In response to determining that the physical control level (e.g., respective one of control levels 130-1 through 130-m) of the user (e.g., respective one of users 104-1 through 104-m) is updated, the processor 120 synchronizes the virtual access level (e.g., respective one of virtual access levels 142-1 through 142-m), the virtual proximity threshold (e.g., respective one of virtual proximity thresholds 144-1 through 144-m), and the virtual administrative access indicator (e.g., respective one of virtual administrative access indicators 146-1 through 146-m) of the user (e.g., respective one of users 104-1 through 104-m) with the updated physical access level (e.g., respective one of physical access levels 132-1 through 132-m), the updated physical proximity threshold (e.g., respective one of physical proximity thresholds 134-1 through 134-m), and the updated physical administrative access indicator (e.g., respective one of physical administrative access indicators 136-1 through 136-m) of the user (e.g., respective one of users 104-1 through 104-m), respectively, to synchronize the virtual control level (e.g., respective one of virtual control levels 140-1 through 140-m) of the digital identity (e.g., respective one of digital identities 138-1 through 138-m) for the user (e.g., respective one of users 104-1 through 104-m) with the updated physical control level (e.g., respective one of physical control levels 130-1 through 130-m) for the user (e.g., respective one of users 104-1 through 104-m).

In certain embodiments, the processor 120 may periodically determine the distance 186 of the user (e.g., respective one of users 104-1 through 104-m) from the entity 176. In response to determining that the distance 186 is not less than the virtual proximity threshold (e.g., respective one of virtual proximity thresholds 144-1 through 144-m) for the user (e.g., respective one of users 104-1 through 104-m), the processor 120 sends an instruction 188 to the metaverse server 156 to deny the user (e.g., respective one of users 104-1 through 104-m) access to the metaverse instance. The processor 120 sends a notification 194 to the user device (e.g., respective one of user devices 106-1 through 106-m) that access to the metaverse instant is denied. In one embodiment, the processor 120 sends a notification 194 to the user device 106-1 that access to the metaverse instant 168 is denied to the user 104-1. In another embodiment, the processor 120 sends a notification 194 to the user device 106-2 that access to the metaverse instant 172 is denied to the user 104-2.

After sending the notification 194 to the user device (e.g., respective one of user devices 106-1 through 106-m) that access to the metaverse instant is denied, the processor 120 sends an instruction 188 to the metaverse server 156 to terminate the metaverse instance. In response to receiving the instruction 188, the processor 158 of the metaverse server 156 terminates the metaverse instance. In one embodiment, the processor 158 terminates metaverse instance 168. In another embodiment, the processor 158 terminates metaverse instance 172.

After sending the instruction 188 to the metaverse server 156 to terminate the metaverse instance, the processor 120 sends an instruction 188 to the metaverse server 156 to release the computing resources that are allocated to the metaverse instance. In response to receiving the instruction 188, the processor 158 of the metaverse server 156 releases the computing resources that are allocated to the metaverse instance. For example, the processor 158 releases the computing resources 152 that are allocated to the metaverse instance 168 for the user 104-1 and the computing resources 154 that are allocated to the metaverse instance 172 for the user 104-2.

In certain embodiments, the processor 120 may periodically determine if a notification 196 is received from the user (e.g., respective one of users 104-1 through 104-m) indicating that interactions of the user (e.g., respective one of users 104-1 through 104-m) with the metaverse instance are completed. In other embodiments, a notification 192 indicating that interactions of the user (e.g., respective one of users 104-1 through 104-m) with the metaverse instance are completed may be received from the metaverse server 156.

In response to determining that the notification 196 is received from the user (e.g., respective one of users 104-1 through 104-m) indicating that interactions of the user (e.g., respective one of users 104-1 through 104-m) with the metaverse instance are completed, the processor 120 sends an instruction 188 to the metaverse server 156 to terminate the metaverse instance. In response to receiving the instruction 188, the processor 158 of the metaverse server 156 terminates the metaverse instance. In one embodiment, the processor 158 terminates metaverse instance 168. In another embodiment, the processor 158 terminates metaverse instance 172.

After sending the instruction 188 to the metaverse server 156 to terminate the metaverse instance, the processor 120 sends an instruction 188 to the metaverse server 156 to release the computing resources that are allocated to the metaverse instance. In response to receiving the instruction 188, the processor 158 of the metaverse server 156 releases the computing resources that are allocated to the metaverse instance. For example, the processor 158 releases the computing resources 152 that are allocated to the metaverse instance 168 for the user 104-1 and the computing resources 154 that are allocated to the metaverse instance 172 for the user 104-2.

Metaverse Server

The metaverse server 156 is generally any device that is configured to process data and communicate with other components of the system 100 via the network 102. The metaverse server 156 may comprise a processor 158 in signal communication with a memory 162 and a network interface 160.

Processor 156 comprises one or more processors operably coupled to the memory 162. The processor 156 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 156 may be a programmable logic device, a microcontroller, a microprocessor, or any suitable combination of the preceding. The one or more processors are configured to process data and may be implemented in hardware or software. For example, the processor 156 may be 8-bit, 16-bit, 32-bit, 64-bit, or of any other suitable architecture. The one or more processors are configured to implement various software instructions to perform the operations described herein. For example, the one or more processors are configured to execute software instructions 164 and perform one or more functions described herein.

Network interface 160 is configured to enable wired and/or wireless communications (e.g., via network 102). The network interface 160 is configured to communicate data between the metaverse server 156 and other components of the system 100. For example, the network interface 160 may comprise a WIFI interface, a local area network (LAN) interface, a wide area network (WAN) interface, a modem, a switch, or a router. The processor 158 is configured to send and receive data using the network interface 160. The network interface 160 may be configured to use any suitable type of communication protocol as would be appreciated by one of ordinary skill in the art.

Memory 162 may be volatile or non-volatile and may comprise a read-only memory (ROM), random-access memory (RAM), ternary content-addressable memory (TCAM), dynamic random-access memory (DRAM), and static random-access memory (SRAM). Memory 162 may be implemented using one or more disks, tape drives, solid-state drives, and/or the like. The memory 162 may store any of the information described in FIGS. 1, 2A, 2B and 2C along with any other data, instructions, logic, rules, or code operable to implement the function(s) described herein. The memory 162 is operable to store software instructions 164, and/or any other data and instructions. The software instructions 164 may comprise any suitable set of software instructions, logic, rules, or code operable to be executed by the processor 158. Memory 162 may further store one or more metaverse instances (e.g., metaverse instances 168 and 172) of the metaverse 166.

Example Method for Managing Metaverse Instances

Figure 2A:
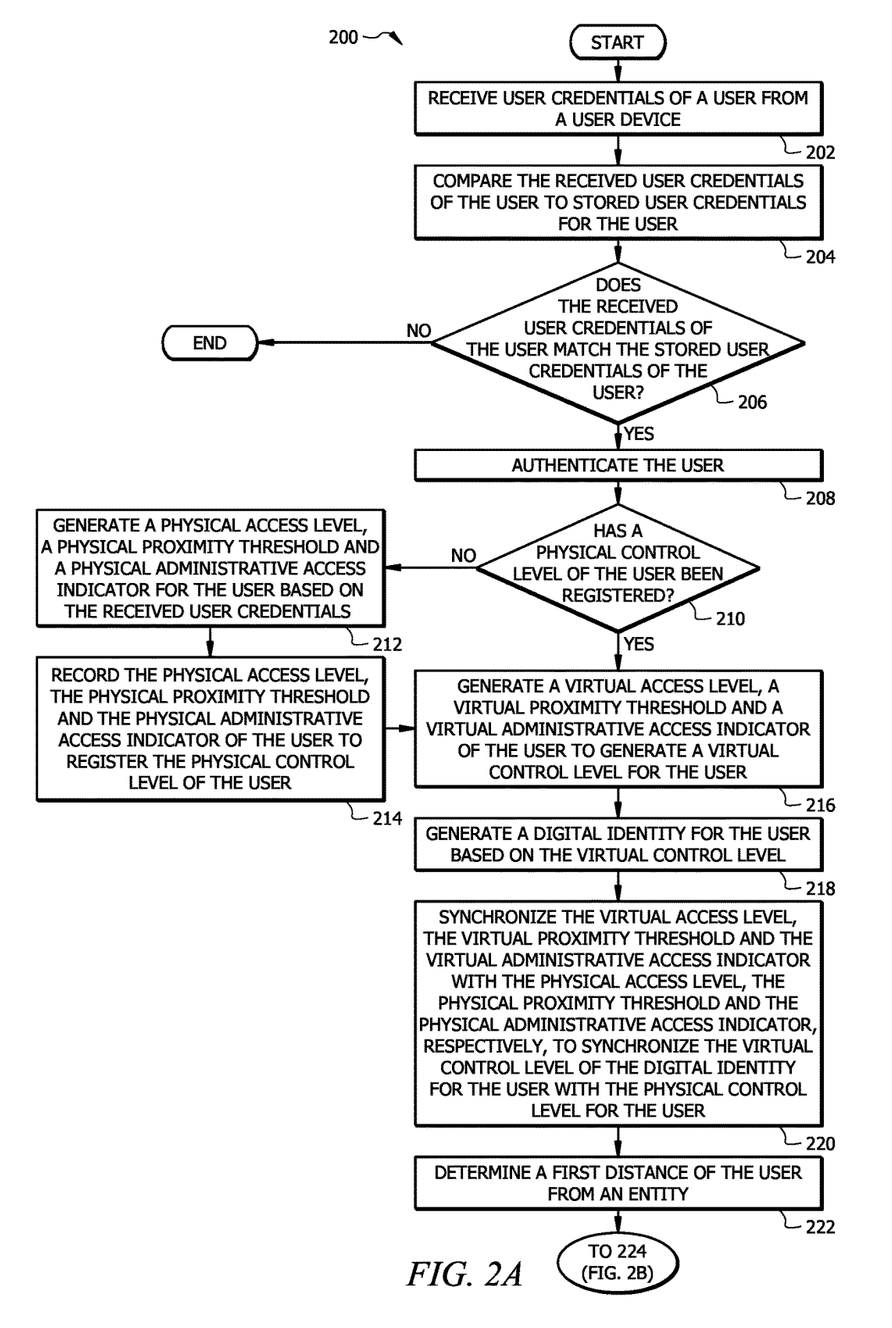
FIGS. 2A, 2B and 2C illustrate an example operational flow of system of FIG. 1 for managing metaverse instances.
Figure 2B:
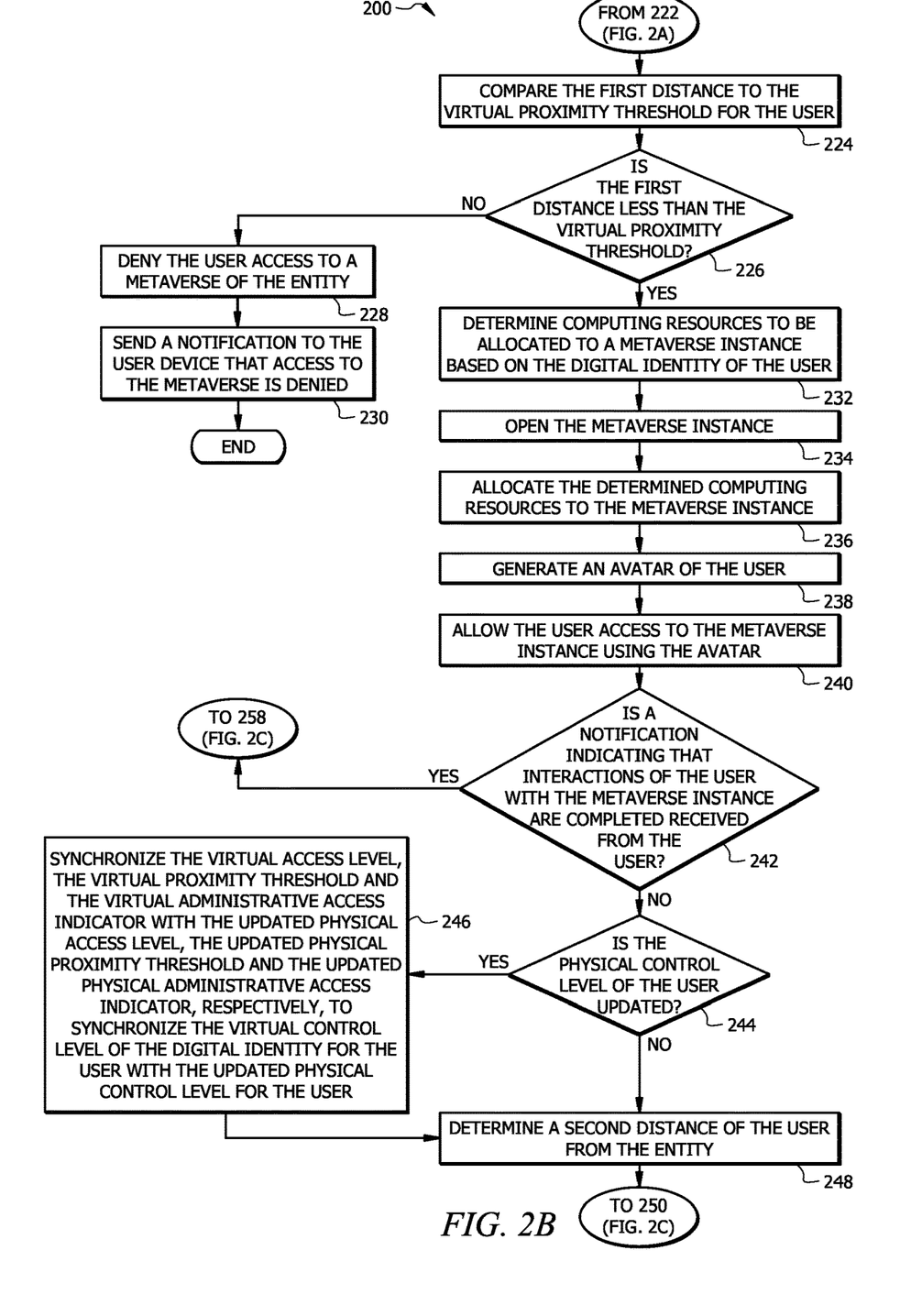
Figure 2C:
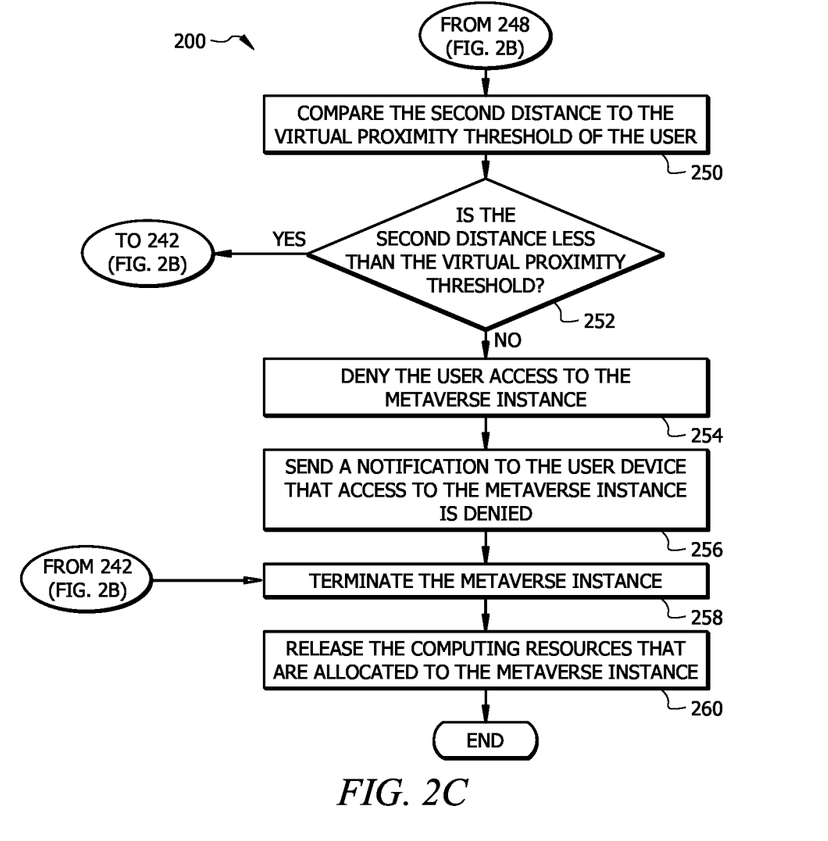

FIGS. 2A, 2B and 2C illustrate an example flowchart of a method 200 for managing metaverse instances. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., instructions 114-1 through 114-m, 126, and/or 164 of FIG. 1), stored on non-transitory, tangible, machine-readable medium (e.g., memories 112-1 through 112-m, 124, and/or 162 of FIG. 1) that when executed by one or more processors (e.g., processors 108-1 through 108-*m*, 120, and/or 158 of FIG. 1) may cause the one or more processors to perform operations 202-260.

At operation 202, a metaverse management system 118 receives user credentials 180 of a user (e.g., respective one of users 104-1 through 104-*m* of FIG. 1) from a user device (e.g., respective one of user devices 106-1 through 106-*m* of FIG. 1).

At operation 204, a processor 120 of the metaverse management system 118 compares the received user credentials 180 of the user (e.g., respective one of users 104-1 through 104-*m* of FIG. 1) to stored user credentials (e.g., respective one of user credentials 116-1 through 116-*m* of FIG. 1) for the user (e.g., respective one of users 104-1 through 104-*m* of FIG. 1).

At operation 206, the processor 120 determines if the received user credentials 180 of the user (e.g., respective one of users 104-1 through 104-*m* of FIG. 1) match the stored user credentials (e.g., respective one of user credentials 116-1 through 116-*m* of FIG. 1) of the user (e.g., respective one of users 104-1 through 104-*m* of FIG. 1).

In response to determining at operation 206 that the received user credentials 180 of the user (e.g., respective one of users 104-1 through 104-*m* of FIG. 1) do not match the stored user credentials (e.g., respective one of user credentials 116-1 through 116-*m* of FIG. 1) of the user (e.g., respective one of users 104-1 through 104-*m* of FIG. 1), method 200 ends.

In response to determining at operation 206 that the received user credentials 180 of the user (e.g., respective one of users 104-1 through 104-*m* of FIG. 1) match the stored user credentials (e.g., respective one of user credentials 116-1 through 116-*m* of FIG. 1) of the user (e.g., respective one of users 104-1 through 104-*m* of FIG. 1), method 200 continues to operation 208.

At operation 208, the processor 120 authenticates the user (e.g., respective one of users 104-1 through 104-*m* of FIG. 1).

At operation 210, the processor 120 determines if a physical control level (e.g., respective one of physical control levels 130-1 through 130-*m* of FIG. 1) of the user (e.g., respective one of users 104-1 through 104-*m* of FIG. 1) has been registered.

In response to determining at operation 210 that the physical control level (e.g., respective one of physical control levels 130-1 through 130-*m* of FIG. 1) of the user (e.g., respective one of users 104-1 through 104-*m* of FIG. 1) has not been registered, method 200 continues to operation 212.

At operation 212, the processor 120 generates a physical access level (e.g., respective one of physical access levels 132-1 through 132-*m* of FIG. 1), a physical proximity threshold (e.g., respective one of physical proximity thresholds 134-1 through 134-*m* of FIG. 1), and a physical administrative access indicator (e.g., respective one of physical administrative access indicators 136-1 through 136-*m* of FIG. 1) for the user (e.g., respective one of users 104-1 through 104-*m* of FIG. 1) based on the received user credentials 180.

At operation 214, the processor 120 records the physical access level (e.g., respective one of physical access levels 132-1 through 132-*m* of FIG. 1), the physical proximity threshold (e.g., respective one of physical proximity thresholds 134-1 through 134-*m* of FIG. 1), and the physical administrative access indicator (e.g., respective one of physical administrative access indicators 136-1 through 136-*m* of FIG. 1) of the user (e.g., respective one of users 104-1 through 104-*m* of FIG. 1) to register the physical control level (e.g., respective one of physical control levels 130-1 through 130-*m* of FIG. 1) of the user (e.g., respective one of users 104-1 through 104-*m* of FIG. 1). After performing operation 214, method 200 continues to operation 216.

In response to determining at operation 210 that the physical control level (e.g., respective one of physical control levels 130-1 through 130-*m* of FIG. 1) of the user (e.g., respective one of users 104-1 through 104-*m* of FIG. 1) has been registered, method 200 continues to operation 216.

At operation 216, the processor 120 generates a virtual access level (e.g., respective one of virtual access levels 142-1 through 142-*m* of FIG. 1), a virtual proximity threshold (e.g., respective one of virtual proximity thresholds 144-1 through 144-*m* of FIG. 1), and a virtual administrative access indicator (e.g., respective one of virtual administrative access indicators 146-1 through 146-*m* of FIG. 1) of the user to generate a virtual control level (e.g., respective one of virtual control levels 140-1 through 140-*m* of FIG. 1) for the user (e.g., respective one of users 104-1 through 104-*m* of FIG. 1).

At operation 218, the processor 120 generates a digital identity (e.g., respective one of digital identities 138-1 through 138-*m* of FIG. 1) for the user (e.g., respective one of users 104-1 through 104-*m* of FIG. 1) based on the virtual control level (e.g., respective one of virtual control levels 140-1 through 140-*m* of FIG. 1).

At operation 220, the processor 120 synchronizes the virtual control level (e.g., respective one of virtual control levels 140-1 through 140-*m* of FIG. 1) of the digital identity (e.g., respective one of digital identities 138-1 through 138-*m* of FIG. 1) for the user (e.g., respective one of users 104-1 through 104-*m* of FIG. 1) with the physical control level (e.g., respective one of physical control levels 130-1 through 130-*m* of FIG. 1) for the user (e.g., respective one of users 104-1 through 104-*m* of FIG. 1), such that the user (e.g., respective one of users 104-1 through 104-*m* of FIG. 1) has a same control level both in physical and virtual worlds. In certain embodiments, the synchronization process comprises equating the virtual access level (e.g., respective one of virtual access levels 142-1 through 142-*m* of FIG. 1), the virtual proximity threshold (e.g., respective one of virtual proximity thresholds 144-1 through 144-*m* of FIG. 1), and the virtual administrative access indicator (e.g., respective one of virtual administrative access indicators 146-1 through 146-*m* of FIG. 1) of the user (e.g., respective one of users 104-1 through 104-*m* of FIG. 1) to the physical access level (e.g., respective one of physical access levels 132-1 through 132-*m* of FIG. 1), the physical proximity threshold (e.g., respective one of physical proximity thresholds 134-1 through 134-*m* of FIG. 1), and the physical administrative access indicator (e.g., respective one of physical administrative access indicators 136-1 through 136-*m* of FIG. 1) of the user (e.g., respective one of users 104-1 through 104-*m* of FIG. 1), respectively.

At operation 222, the processor 120 determines a first distance (e.g., distance 186 of FIG. 1) of the user (e.g., respective one of users 104-1 through 104-*m* of FIG. 1) from an entity (e.g., entity 176 of FIG. 1).

At operation 224, the processor 120 compares the first distance (e.g., distance 186 of FIG. 1) to the virtual proximity threshold (e.g., respective one of virtual proximity thresholds 144-1 through 144-*m* of FIG. 1) of the user (e.g., respective one of users 104-1 through 104-*m* of FIG. 1).

At operation 226, the processor 120 determines if the first distance (e.g., distance 186 of FIG. 1) is less than the virtual proximity threshold (e.g., respective one of virtual proximity thresholds 144-1 through 144-*m* of FIG. 1).

In response to determining at operation 226 that the first distance (e.g., distance 186 of FIG. 1) is not less than the virtual proximity threshold (e.g., respective one of virtual proximity thresholds 144-1 through 144-*m* of FIG. 1), method 200 continues to operation 228.

At operation 228, the processor 120 denies the user (e.g., respective one of users 104-1 through 104-*m* of FIG. 1) access to a metaverse (e.g., metaverse 166 of FIG. 1) of the entity (e.g., entity 176 of FIG. 1).

At operation 230, the processor 120 sends a notification (e.g., notification 194 of FIG. 1) to the user device (e.g., respective one of user devices 106-1 through 106-*m* of FIG. 1) that access to the metaverse (e.g., metaverse 166 of FIG. 1) is denied. After performing operation 230, method 200 ends.

In response to determining at operation 226 that the first distance (e.g., distance 186 of FIG. 1) is less than the virtual proximity threshold (e.g., respective one of virtual proximity thresholds 144-1 through 144-*m* of FIG. 1), method 200 continues to operation 232.

At operation 232, the processor 120 determines computing resources (e.g., computing resources 152 of FIG. 1) to be allocated to a metaverse instance (e.g., metaverse instance 168 of FIG. 1) based on the digital identity (e.g., respective one of digital identities 138-1 through 138-*m* of FIG. 1) of the user (e.g., respective one of users 104-1 through 104-*m* of FIG. 1).

At operation 234, the metaverse instance (e.g., metaverse instance 168 of FIG. 1) is opened. In certain embodiments, the processor 120 sends an instruction (e.g., respective one of instructions 188 of FIG. 1) to the metaverse server 156 to open the metaverse instance (e.g., metaverse instance 168 of FIG. 1). In response to receiving the instruction (e.g., respective one of instructions 188 of FIG. 1), the processor 158 of the metaverse server 156 opens the metaverse instance (e.g., metaverse instance 168 of FIG. 1).

At operation 236, the determined computing resources (e.g., computing resources 152 of FIG. 1) are allocated to the metaverse instance (e.g., metaverse instance 168 of FIG. 1). In certain embodiments, the processor 120 sends an instruction (e.g., respective one of instructions 188 of FIG. 1) to the metaverse server 156 to allocates the determined computing resources (e.g., computing resources 152 of FIG. 1) to the metaverse instance (e.g., metaverse instance 168 of FIG. 1). In response to receiving the instruction (e.g., respective one of instructions 188 of FIG. 1), the processor 158 of the metaverse server 156 allocates the determined computing resources (e.g., computing resources 152 of FIG. 1) to the metaverse instance (e.g., metaverse instance 168 of FIG. 1).

At operation 238, an avatar (e.g., avatar 170 of FIG. 1) of the user (e.g., respective one of users 104-1 through 104-*m* of FIG. 1) is generated. In certain embodiments, the processor 120 sends an instruction (e.g., respective one of instructions 188 of FIG. 1) to the metaverse server 156 to generate the avatar (e.g., avatar 170 of FIG. 1) of the user (e.g., respective one of users 104-1 through 104-*m* of FIG. 1). In response to receiving the instruction (e.g., respective one of instructions 188 of FIG. 1), the processor 158 of the metaverse server 156 generates the avatar (e.g., avatar 170 of FIG. 1) of the user (e.g., respective one of users 104-1 through 104-*m* of FIG. 1).

At operation 240, the processor 120 allows the user (e.g., respective one of users 104-1 through 104-*m* of FIG. 1) access to the metaverse instance (e.g., metaverse instance 168 of FIG. 1) using the avatar (e.g., avatar 170 of FIG. 1). In certain embodiments, the processor 120 sends the digital identity (e.g., respective one of digital identities 138-1 through 138-*m* of FIG. 1) to the user device (e.g., respective one of user devices 106-1 through 106-*m* of FIG. 1), which allows the user (e.g., respective one of users 104-1 through 104-*m* of FIG. 1) access to the metaverse instance (e.g., metaverse instance 168 of FIG. 1) using the avatar (e.g., avatar 170 of FIG. 1).

At operation 242, the processor 120 determines if a notification (e.g., respective one of notifications 196 of FIG. 1) is received from the user (e.g., respective one of users 104-1 through 104-*m* of FIG. 1) indicating that interactions of the user (e.g., respective one of users 104-1 through 104-*m* of FIG. 1) with the metaverse instance (e.g., metaverse instance 168 of FIG. 1) are completed.

In response to determining at operation 242 that the notification (e.g., respective one of notifications 196 of FIG. 1) is received from the user (e.g., respective one of users 104-1 through 104-*m* of FIG. 1) indicating that interactions of the user (e.g., respective one of users 104-1 through 104-*m* of FIG. 1) with the metaverse instance (e.g., metaverse instance 168 of FIG. 1) are completed, method 200 continues to operation 258.

At operation 258, the metaverse instance (e.g., metaverse instance 168 of FIG. 1) is terminated. In certain embodiments, the processor 120 sends an instruction (e.g., respective one of instructions 188 of FIG. 1) to the metaverse server 156 to terminate the metaverse instance (e.g., metaverse instance 168 of FIG. 1). In response to receiving the instruction (e.g., respective one of instructions 188 of FIG. 1), the processor 158 of the metaverse server 156 terminates the metaverse instance (e.g., metaverse instance 168 of FIG. 1).

At operation 260, the computing resources (e.g., computing resources 152 of FIG. 1) that are allocated to the metaverse instance (e.g., metaverse instance 168 of FIG. 1) are released. In certain embodiments, the processor 120 sends an instruction (e.g., respective one of instructions 188 of FIG. 1) to the metaverse server 156 to release the computing resources (e.g., computing resources 152 of FIG. 1) that are allocated to the metaverse instance (e.g., metaverse instance 168 of FIG. 1). In response to receiving the instruction (e.g., respective one of instructions 188 of FIG. 1), the processor 158 of the metaverse server 156 releases the computing resources (e.g., computing resources 152 of FIG. 1) that are allocated to the metaverse instance (e.g., metaverse instance 168 of FIG. 1). After performing operation 260, method 200 ends.

In response to determining at operation 242 that the notification (e.g., respective one of notifications 196 of FIG. 1) is not received from the user (e.g., respective one of users 104-1 through 104-*m* of FIG. 1) indicating that interactions of the user (e.g., respective one of users 104-1 through 104-*m* of FIG. 1) with the metaverse instance (e.g., metaverse instance 168 of FIG. 1) are completed, method 200 continues to operation 244.

At operation 244, the processor 120 determines if the physical control level (e.g., respective one of physical control levels 130-1 through 130-*m* of FIG. 1) of the user (e.g., respective one of users 104-1 through 104-*m* of FIG. 1) is updated.

In response to determining at operation 244 that the physical control level (e.g., respective one of physical control levels 130-1 through 130-*m* of FIG. 1) of the user (e.g., respective one of users 104-1 through 104-*m* of FIG. 1) is updated, method 200 continues to operation 246.

At operation 246, the processor 120 synchronizes the virtual access level (e.g., respective one of virtual access levels 142-1 through 142-*m* of FIG. 1), the virtual proximity threshold (e.g., respective one of virtual proximity thresholds 144-1 through 144-m of FIG. 1), and the virtual administrative access indicator (e.g., respective one of virtual administrative access indicators 146-1 through 146-m of FIG. 1) of the user (e.g., respective one of users 104-1 through 104-m of FIG. 1) with the updated physical access level (e.g., respective one of physical access levels 132-1 through 132-m of FIG. 1), the updated physical proximity threshold (e.g., respective one of physical proximity thresholds 134-1 through 134-m of FIG. 1), and the updated physical administrative access indicator (e.g., respective one of physical administrative access indicators 136-1 through 136-m of FIG. 1) of the user (e.g., respective one of users 104-1 through 104-m of FIG. 1), respectively, to synchronize the virtual control level (e.g., respective one of virtual control levels 140-1 through 140-m of FIG. 1) of the digital identity (e.g., respective one of digital identities 138-1 through 138-m of FIG. 1) for the user (e.g., respective one of users 104-1 through 104-m of FIG. 1) with the updated physical control level (e.g., respective one of physical control levels 130-1 through 130-m of FIG. 1) for the user (e.g., respective one of users 104-1 through 104-m of FIG. 1). After performing operation 246, method 200 continues to operation 248.

In response to determining at operation 244 that the physical control level (e.g., respective one of physical control levels 130-1 through 130-m of FIG. 1) of the user (e.g., respective one of users 104-1 through 104-m of FIG. 1) is not updated, method 200 continues to operation 248.

At operation 248, the processor 120 determines a second distance (e.g., respective one of distances 186 of FIG. 1) of the user (e.g., respective one of users 104-1 through 104-m of FIG. 1) from the entity (e.g., entity 176 of FIG. 1). In certain embodiments, the second distance (e.g., respective one of distances 186 of FIG. 1) is same as the first distance (e.g., respective one of distances 186 of FIG. 1). In certain embodiments, the second distance (e.g., respective one of distances 186 of FIG. 1) is different from the first distance (e.g., respective one of distances 186 of FIG. 1).

At operation 250, the processor 120 compares the second distance (e.g., respective one of distances 186 of FIG. 1) to the virtual proximity threshold (e.g., respective one of virtual proximity thresholds 144-1 through 144-m of FIG. 1) of the user (e.g., respective one of users 104-1 through 104-m of FIG. 1).

At operation 252, the processor 120 determines if the second distance (e.g., respective one of distances 186 of FIG. 1) is less than the virtual proximity threshold (e.g., respective one of virtual proximity thresholds 144-1 through 144-m of FIG. 1).

In response to determining at operation 252 that the second distance (e.g., respective one of distances 186 of FIG. 1) is less than the virtual proximity threshold (e.g., respective one of virtual proximity thresholds 144-1 through 144-m of FIG. 1), method 200 continues back to operation 242.

In response to determining at operation 252 that the second distance (e.g., respective one of distances 186 of FIG. 1) is not less than the virtual proximity threshold (e.g., respective one of virtual proximity thresholds 144-1 through 144-m of FIG. 1), method 200 continues to operation 254.

At operation 254, the user (e.g., respective one of users 104-1 through 104-m of FIG. 1) is denied access to the metaverse instance (e.g., metaverse instance 168 of FIG. 1). In certain embodiments, the processor 120 sends an instruction (e.g., respective one of instructions 188 of FIG. 1) to the metaverse server 156 to deny the user (e.g., respective one of users 104-1 through 104-m of FIG. 1) access to the metaverse instance (e.g., metaverse instance 168 of FIG. 1).

At operation 256, the processor 120 sends a notification (e.g., respective one of notifications 194 of FIG. 1) to the user device (e.g., respective one of user devices 106-1 through 106-m of FIG. 1) that access to the metaverse instant (e.g., metaverse instance 168 of FIG. 1) is denied.

At operation 258, the metaverse instance (e.g., metaverse instance 168 of FIG. 1) is terminated. In certain embodiments, the processor 120 sends an instruction (e.g., respective one of instructions 188 of FIG. 1) to the metaverse server 156 to terminate the metaverse instance (e.g., metaverse instance 168 of FIG. 1). In response to receiving the instruction (e.g., respective one of instructions 188 of FIG. 1), the processor 158 of the metaverse server 156 terminates the metaverse instance (e.g., metaverse instance 168 of FIG. 1).

At operation 260, the computing resources (e.g., computing resources 152 of FIG. 1) that are allocated to the metaverse instance (e.g., metaverse instance 168 of FIG. 1) are released. In certain embodiments, the processor 120 sends an instruction (e.g., respective one of instructions 188 of FIG. 1) to the metaverse server 156 to release the computing resources (e.g., computing resources 152 of FIG. 1) that are allocated to the metaverse instance (e.g., metaverse instance 168 of FIG. 1). In response to receiving the instruction (e.g., respective one of instructions 188 of FIG. 1), the processor 158 of the metaverse server 156 releases the computing resources (e.g., computing resources 152 of FIG. 1) that are allocated to the metaverse instance (e.g., meta verse instance 168 of FIG. 1). After performing operation 260, method 200 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:
1. A system comprising:
   a memory configured to store:
      physical control levels for a plurality of users, wherein each physical control level comprises:

a physical access level for a respective user, wherein the physical access level comprises information about physical locations and data items that the respective user is allowed to access within an entity;
a physical proximity threshold for the respective user; and
a physical administrative access indicator for the respective user, wherein the physical administrative access indicator indicates if the respective user has an administrative access; and
user credentials for each user; and
a processor communicatively coupled to the memory, wherein the processor is configured to:
receive first user credentials of a first user from a first user device;
authenticate the first user based on the first user credentials;
register a first physical control level for the first user, wherein the first physical control level comprises:
a first physical access level for the first user;
a first physical proximity threshold for the first user; and
a first physical administrative access indicator for the first user;
generate a first digital identity for the first user based on the first user credentials of the first user, wherein the first digital identity comprises a first virtual control level for a first avatar of the first user, wherein the first digital identity allows the first avatar of the first user to access a first metaverse instance of a metaverse of the entity based on the first virtual control level, and wherein the first virtual control level comprises:
a first virtual access level for the first user;
a first virtual proximity threshold for the first user; and
a first virtual administrative access indicator for the first user;
synchronize the first virtual control level of the first digital identity for the first user with the first physical control level for the first user;
determine a first physical distance of the first user from the entity;
determine if the first physical distance of the first user is less than the first virtual proximity threshold; and
in response to determining that the first physical distance is less than the first virtual proximity threshold:
determine first computing resources to be allocated to the first metaverse instance based on the first digital identity;
send a first instruction to a metaverse server to open the first metaverse instance;
send a second instruction to the metaverse server to allocate the first computing resources to the first metaverse instance;
send a third instruction to the metaverse server to generate the first avatar of the first user; and
allow the first avatar of the first user access to the first metaverse instance.

2. The system of claim 1, wherein the processor is further configured to:
in response to determining that the first physical distance is not less than the first virtual proximity threshold:
deny the first user access to the metaverse; and
send a first notification to the first user device that access to the metaverse is denied.

3. The system of claim 1, wherein determining the first physical distance of the first user comprises:
sending a first request to one or more ultra-wide band sensors of the entity to obtain the first physical distance of the first user from the entity; and
receiving the first physical distance of the first user from the one or more ultra-wide band sensors.

4. The system of claim 1, wherein the processor is further configured to:
send a fourth instruction to the metaverse server to terminate the first metaverse instance; and
send a fifth instruction to the metaverse server to release the first computing resources that are allocated to the first metaverse instance.

5. The system of claim 1, wherein the processor is further configured to:
receive second user credentials of a second user from a second user device;
authenticate the second user based on the second user credentials;
register a second physical control level for the second user, wherein the second physical control level comprises:
a second physical access level for the second user, wherein the second physical access level is different from the first physical access level;
a second physical proximity threshold for the second user, wherein the second physical proximity threshold is different from the first physical proximity threshold; and
a second physical administrative access indicator for the second user;
generate a second digital identity for the second user based on the second user credentials of the second user, wherein the second digital identity comprises a second virtual control level for a second avatar of the second user, wherein the second digital identity allows the second avatar of the second user to access a second metaverse instance of the metaverse based on the second virtual control level, wherein the second metaverse instance is different from the first metaverse instance, and wherein the second virtual control level comprises:
a second virtual access level for the second user;
a second virtual proximity threshold for the second user; and
a second virtual administrative access indicator for the second user;
synchronize the second virtual control level of the second digital identity for the second user with the second physical control level for the second user;
determine a second physical distance of the second user from the entity, wherein the second physical distance is different from the first physical distance;
determine if the second physical distance of the second user is less than the second virtual proximity threshold; and
in response to determining that the second physical distance is less than the second virtual proximity threshold:
determine second computing resources to be allocated to the second metaverse instance based on the second digital identity;
send a fourth instruction to the metaverse server to open the second metaverse instance;

send a fifth instruction to the metaverse server to allocate the second computing resources to the second metaverse instance;
send a sixth instruction to the metaverse server to generate the second avatar of the second user; and
allow the second avatar of the second user access to the second metaverse instance.

6. The system of claim 5, wherein the processor is further configured to:
in response to determining that the second physical distance is not less than the second virtual proximity threshold:
deny the second user access to the metaverse; and
send a second notification to the second user device that access to the metaverse is denied.

7. The system of claim 5, wherein the processor is further configured to:
send a seventh instruction to the metaverse server to terminate the second metaverse instance; and
send an eighth instruction to the metaverse server to release the second computing resources that are allocated to the second metaverse instance.

8. A method comprising:
receiving first user credentials of a first user from a first user device;
authenticating the first user based on the first user credentials;
registering a first physical control level for the first user, wherein the first physical control level comprises:
a first physical access level for the first user, wherein the first physical access level comprises information about physical locations and data items that the first user is allowed to access within an entity;
a first physical proximity threshold for the first user; and
a first physical administrative access indicator for the first user, wherein the first physical administrative access indicator indicates if the first user has an administrative access;
generating a first digital identity for the first user based on the first user credentials of the first user, wherein the first digital identity comprises a first virtual control level for a first avatar of the first user, wherein the first digital identity allows the first avatar of the first user to access a first metaverse instance of a metaverse of the entity based on the first virtual control level, and wherein the first virtual control level comprises:
a first virtual access level for the first user;
a first virtual proximity threshold for the first user; and
a first virtual administrative access indicator for the first user;
synchronizing the first virtual control level of the first digital identity for the first user with the first physical control level for the first user;
determining a first physical distance of the first user from the entity;
determining if the first physical distance of the first user is less than the first virtual proximity threshold;
in response to determining that the first physical distance is less than the first virtual proximity threshold:
determining first computing resources to be allocated to the first metaverse instance based on the first digital identity;
sending a first instruction to a metaverse server to open the first metaverse instance;
sending a second instruction to the metaverse server to allocate the first computing resources to the first metaverse instance;
sending a third instruction to the metaverse server to generate the first avatar of the first user; and
allowing the first avatar of the first user access to the first metaverse instance.

9. The method of claim 8, further comprising:
in response to determining that the first physical distance is not less than the first virtual proximity threshold:
denying the first user access to the metaverse; and
sending a first notification to the first user device that access to the metaverse is denied.

10. The method of claim 8, wherein determining the first physical distance of the first user comprises:
sending a first request to one or more ultra-wide band sensors of the entity to obtain the first physical distance of the first user from the entity; and
receiving the first physical distance of the first user from the one or more ultra-wide band sensors.

11. The method of claim 8, further comprising:
sending a fourth instruction to the metaverse server to terminate the first metaverse instance; and
sending a fifth instruction to the metaverse server to release the first computing resources that are allocated to the first metaverse instance.

12. The method of claim 8, further comprising:
receiving second user credentials of a second user from a second user device;
authenticating the second user based on the second user credentials;
registering a second physical control level for the second user, wherein the second physical control level comprises:
a second physical access level for the second user, wherein the second physical access level is different from the first physical access level;
a second physical proximity threshold for the second user, wherein the second physical proximity threshold is different from the first physical proximity threshold; and
a second physical administrative access indicator for the second user;
generating a second digital identity for the second user based on the second user credentials of the second user, wherein the second digital identity comprises a second virtual control level for a second avatar of the second user, wherein the second digital identity allows the second avatar of the second user to access a second metaverse instance of the metaverse based on the second virtual control level, wherein the second metaverse instance is different from the first metaverse instance, and wherein the second virtual control level comprises:
a second virtual access level for the second user;
a second virtual proximity threshold for the second user; and
a second virtual administrative access indicator for the second user;
synchronizing the second virtual control level of the second digital identity for the second user with the second physical control level for the second user;
determining a second physical distance of the second user from the entity, wherein the second physical distance is different from the first physical distance;

determining if the second physical distance of the second user is less than the second virtual proximity threshold; and in response to determining that the second physical distance is less than the second virtual proximity threshold:
 determining second computing resources to be allocated to the second metaverse instance based on the second digital identity;
 sending a fourth instruction to the metaverse server to open the second metaverse instance;
 sending a fifth instruction to the metaverse server to allocate the second computing resources to the second metaverse instance;
 sending a sixth instruction to the metaverse server to generate the second avatar of the second user; and
 allowing the second avatar of the second user access to the second metaverse instance.

13. The method of claim 12, further comprising:
in response to determining that the second physical distance is not less than the second virtual proximity threshold:
 denying the second user access to the metaverse; and
 sending a second notification to the second user device that access to the metaverse is denied.

14. The method of claim 12, further comprising:
sending a seventh instruction to the metaverse server to terminate the second metaverse instance; and
sending an eighth instruction to the metaverse server to release the second computing resources that are allocated to the second metaverse instance.

15. A non-transitory computer-readable medium storing instructions that, when executed by one or more processors, cause the one or more processors to:
 receive first user credentials of a first user from a first user device;
 authenticate the first user based on the first user credentials;
 register a first physical control level for the first user, wherein the first physical control level comprises:
  a first physical access level for the first user, wherein the first physical access level comprises information about physical locations and data items that the first user is allowed to access within an entity;
  a first physical proximity threshold for the first user; and
  a first physical administrative access indicator for the first user, wherein the first physical administrative access indicator indicates if the first user has an administrative access;
 generate a first digital identity for the first user based on the first user credentials of the first user, wherein the first digital identity comprises a first virtual control level for a first avatar of the first user, wherein the first digital identity allows the first avatar of the first user to access a first metaverse instance of a metaverse of the entity based on the first virtual control level, and wherein the first virtual control level comprises:
  a first virtual access level for the first user;
  a first virtual proximity threshold for the first user; and
  a first virtual administrative access indicator for the first user;
 synchronize the first virtual control level of the first digital identity for the first user with the first physical control level for the first user;
 determine a first physical distance of the first user from the entity;

determine if the first physical distance of the first user is less than the first virtual proximity threshold;
in response to determining that the first physical distance is less than the first virtual proximity threshold:
 determine first computing resources to be allocated to the first metaverse instance based on the first digital identity;
 send a first instruction to a metaverse server to open the first metaverse instance;
 send a second instruction to the metaverse server to allocate the first computing resources to the first metaverse instance;
 send a third instruction to the metaverse server to generate the first avatar of the first user; and
 allow the first avatar of the first user access to the first metaverse instance.

16. The non-transitory computer-readable medium of claim 15, wherein the instructions, when executed by the one or more processors, further cause the one or more processors to:
 in response to determining that the first physical distance is not less than the first virtual proximity threshold:
  deny the first user access to the metaverse; and
  send a first notification to the first user device that access to the metaverse is denied.

17. The non-transitory computer-readable medium of claim 15, wherein determining the first physical distance of the first user comprises:
 sending a first request to one or more ultra-wide band sensors of the entity to obtain the first physical distance of the first user from the entity; and
 receiving the first physical distance of the first user from the one or more ultra-wide band sensors.

18. The non-transitory computer-readable medium of claim 15, wherein the instructions, when executed by the one or more processors, further cause the one or more processors to:
 send a fourth instruction to the metaverse server to terminate the first metaverse instance; and
 send a fifth instruction to the metaverse server to release the first computing resources that are allocated to the first metaverse instance.

19. The non-transitory computer-readable medium of claim 15, wherein the instructions, when executed by the one or more processors, further cause the one or more processors to:
 receive second user credentials of a second user from a second user device;
 authenticate the second user based on the second user credentials;
 register a second physical control level for the second user, wherein the second physical control level comprises:
  a second physical access level for the second user, wherein the second physical access level is different from the first physical access level;
  a second physical proximity threshold for the second user, wherein the second physical proximity threshold is different from the first physical proximity threshold; and
  a second physical administrative access indicator for the second user;
 generate a second digital identity for the second user based on the second user credentials of the second user, wherein the second digital identity comprises a second virtual control level for a second avatar of the second user, wherein the second digital identity allows the second avatar of the second user to access a second metaverse instance of the metaverse based on the second virtual control level, wherein the second metaverse instance is different from the first metaverse instance, and wherein the second virtual control level comprises:
   a second virtual access level for the second user;
   a second virtual proximity threshold for the second user; and
   a second virtual administrative access indicator for the second user;
synchronize the second virtual control level of the second digital identity for the second user with the second physical control level for the second user;
determine a second physical distance of the second user from the entity, wherein the second physical distance is different from the first physical distance;
determine if the second physical distance of the second user is less than the second virtual proximity threshold; and
in response to determining that the second physical distance is less than the second virtual proximity threshold:
   determine second computing resources to be allocated to the second metaverse instance based on the second digital identity;
   send a fourth instruction to the metaverse server to open the second metaverse instance;
   send a fifth instruction to the metaverse server to allocate the second computing resources to the second metaverse instance;
   send a sixth instruction to the metaverse server to generate the second avatar of the second user; and
allow the second avatar of the second user access to the second metaverse instance.

20. The non-transitory computer-readable medium of claim 19, wherein the instructions, when executed by the one or more processors, further cause the one or more processors to:
   in response to determining that the second physical distance is not less than the second virtual proximity threshold:
      deny the second user access to the metaverse; and
      send a second notification to the second user device that access to the metaverse is denied.

\* \* \* \* \*